United States Patent [19]

Ridha

[11] 4,072,358
[45] Feb. 7, 1978

[54] COMPRESSION MOLDED CUT-FIBER REINFORCED PLASTIC WHEELS

[75] Inventor: Raouf Abdul Ridha, Kent, Ohio

[73] Assignee: The Firestone Tire & Rubber Company, Akron, Ohio

[21] Appl. No.: 680,821

[22] Filed: Apr. 28, 1976

[51] Int. Cl.$^2$ ............................................. B60B 1/06
[52] U.S. Cl. .............................................. 301/63 PW
[58] Field of Search ....................... 301/63 PW, 63 R; 295/30

[56] References Cited

U.S. PATENT DOCUMENTS

| | | | |
|---|---|---|---|
| 2,817,381 | 12/1957 | Powers | 152/381 |
| 3,143,377 | 8/1964 | Bulgrin et al. | 301/63 |
| 3,357,747 | 12/1967 | Eldred | 301/63 |
| 3,811,737 | 5/1974 | Lejeune | 301/63 PW |
| 3,917,352 | 11/1975 | Gageby | 301/63 PW |
| 3,940,357 | 2/1976 | Fehey | 260/29.3 |

FOREIGN PATENT DOCUMENTS

| | | | |
|---|---|---|---|
| 2,101,247 | 8/1972 | Germany. | |
| 2,513,156 | 10/1975 | Germany | 301/63 PW |
| 2,513,187 | 10/1975 | Germany | 301/63 PW |

OTHER PUBLICATIONS

Modern Plastics Encyclopedia 1971–1972, pp. 348 and 350.

*Primary Examiner*—Robert B. Reeves
*Assistant Examiner*—H. Grant Skaggs

[57] ABSTRACT

A compression molded cut-fiber reinforced plastic wheel for pneumatic tires, tubeless and tube type, is prepared by compression molding, for example, a polyimide plastic containing about 65% by weight of cut glass fiber, the compression molded wheel being of increased dimension at points of maximum stress and said cut fibers being predominantly axially oriented.

6 Claims, 3 Drawing Figures

COMPRESSION MOLDED CUT-FIBER REINFORCED PLASTIC WHEELS

BACKGROUND OF THE INVENTION

1. Field of the Invention

The present invention is directed to a plastic wheel made of a cut fiber reinforced plastic, said wheel being compression molded and said cut fiber being predominantly axially oriented to achieve uniform strength and distribution of the cut fibers.

2. Description of the Prior Art

In German Pat. No. 2,101,247 it is disclosed that a wheel rim can be fabricated from polyamide resin reinforced with glass fibers. It is alleged in this patent that the synthetic resin rims are equal in performance to those rims made of metal. It is also disclosed that the wall portions may be of varied thickness relating to particular stresses as may be encountered. The rim claimed is stated to be injection molded.

U.S. Pat. No. 3,811,737 is directed to a reinforced plastic resin wheel, which wheel is stated to overcome the problems reflected in the region of attachment of said wheel to conventional braking forces in that these regions of attachments of known plastic wheels do not withstand the forces transmitted by the metal parts such as bolts and nuts. The inventive feature claimed to represent an advance in the art by the Patentee is that of reinforcing the plastic holes with rigid plate (metal means) imbedded in the thickness of the disc and flush with or protruding from the outer face of the disc. This metal reinforcement is stated to effectively resolve the problem of excessive wear as would be achieved if the edges of the resin hole per se came into contact with said bolt.

U.S. Pat. No. 3,940,357, together with the prior art references cited therein, relating to glass fiber forming and coating processes, are incorporated by reference at this point. The resin coated cut glass fibers produced in accordance with this patent, and the references identified therein in columns 1 and 2, represent a typical process and product that can be utilized for the cut fiber glass reinforcing material utilized in applicant's plastic wheel as herein described and claimed. *Modern Plastics Encyclopedia* 1971–1972, Pages 348 and 350, disclose a typical compression molding apparatus and procedure that can be utilized to compression mold the cut fiber glass reinforced plastic wheel of the present invention.

SUMMARY OF THE INVENTION

The present invention provides a compression molded reinforced plastic wheel, which wheel can be readily substituted for the significantly heavier steel wheels now more generally used in, for example, automotive passenger wheel construction. The plastic wheels of applicant's invention are made to be acceptable visually, with the use of, for example, chrome plated nuts, to thus eliminate the need for the conventional decorative hub cap. The color of a given plastic wheel can be varied with the use of dyes and/or dyed cut glass fibers.

The plastic wheel of my invention has an acceptable life span of performance for its intended use on, for example, passenger cars and/or trucks, including off-the-road vehicles. The disc portion of the invention plastic wheel is compressed on bolting down to friction fit to the outer brake drum surface without any contacting surface modification being required. This disc portion is not adversely affected by the normal heat generated through the brake drum with which it may be in intimate contact after bolting.

It is noted that compression molding is required to achieve uniform distribution of the axially oriented cut glass fibers in applicant's plastic wheel. If the prior art procedure of injection molding is utilized, a random pattern and distribution of the cut fibers results to thus give a non-uniform concentration and distribution of same, and non-uniform property results throughout the various portions of the wheel or wheel member.

BRIEF DESCRIPTION OF THE DRAWING

A further understanding of the present invention is obtained by considering the description of the appended preferred embodiment of the drawing wherein.

DESCRIPTION OF THE PREFERRED EMBODIMENT

Figure 1:
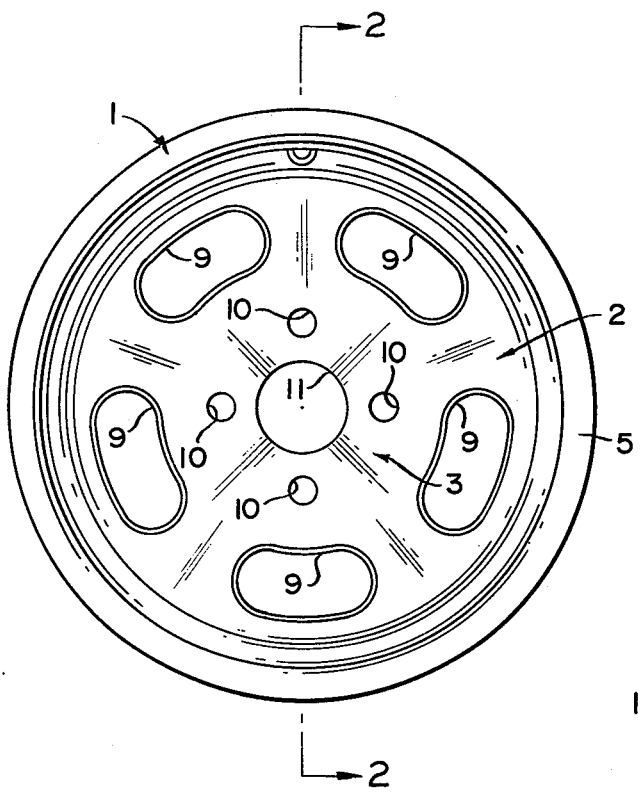
FIG. 1 is a full side view of the side of the wheel identified as the left side of FIG. 2.
Figure 2:
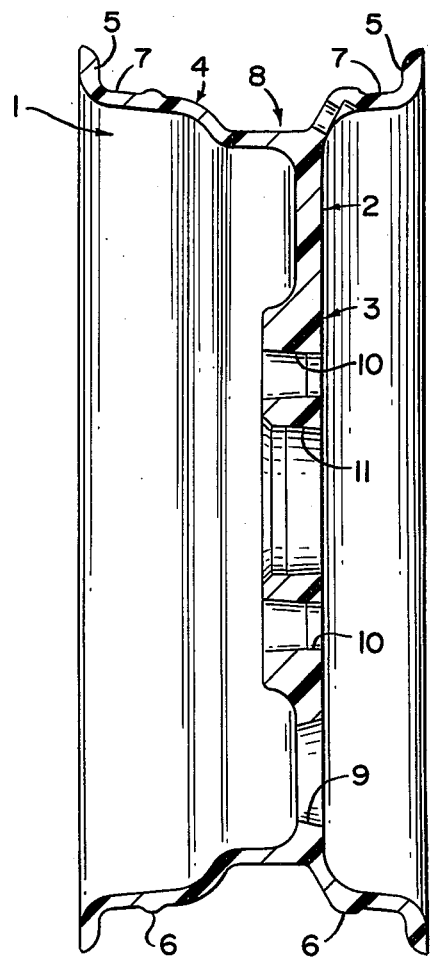
FIG. 2 is a cross-sectional view along the line 2—2 of FIG. 1.
Figure 3:
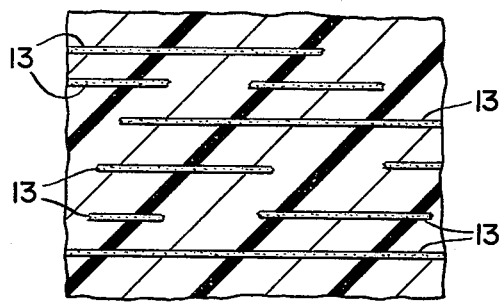
FIG. 3 is a fragmentary cross-section of the plastic wheel matrix with uniform axially oriented cut fibers 13.

FIGS. 1 and 2 show a cut fiber reinforced polyimide plastic wheel that has been compression molded. Rim portion 1 meets the conventional design specification as does disc member 2 which is a unitary part thereof. On bolting down said disc through bolt holes 10, around a hub via hub opening 11, a friction fitting, for example, to the outer surface of a given brake drum is achieved. The disc bolt holes (after extended use) as determined by visual analysis, do not show any wearing to have taken place and thus avoids the need for reinforcing elements to avoid bolt wear as taught by the prior art.

Disc 2 attaches to the hub and transmits vehicle loads plus driving and braking torques to rim 1.

Rim 1 transfers the loads from disc 2 to the tire. It includes flanges 5 to restrain outward movement of the tire beads, ledges 7 to seat the tire, a drop center 8 for tire mounting and dismounting, and transition seqments between these parts.

Disc 2 consists of an outer part with openings 9 for ventilation and decorative purposes, and an inner part 3 which includes bolt holes 10 and hub opening 11.

Rim cross-section contour 4 incorporates gentle curves and gradual changes of thickness in order to facilitate material flow during molding and achieve optimum orientation of the reinforcement fibers 13. Hump portions 6 prevent bead unseating.

The reinforced plastic rim as produced above reflects fully acceptable tensile strength, compression and impact properties. Although the preceding description is essentially directed to the preparation of passenger tire wheels, the technology and procedure is fully adaptable to the fabrication of plastic wheels, rims and/or disc members for trucks. In the preparation of plastic truck wheels, for example, the rim thickness can be varied to suit calculated and measured stress distributions in the rim. Also, in the case of off-the-road vehicles and trucks, continuous filament rings can be incorporated in the plastic one-piece wheel of the present invention in maximum stress areas such as the corners near bead seats and the ends of the drop center.

The particular plastic selected to mold the wheels of the present invention is not critical. For example, it can be a polyimide (as provided by Rhodia, Inc.), a polyester (HMC sheet molding compound from P.P.G. Industries, Inc.), nylon, epoxy, polypropylene or a blend prepared from these materials.

As stated herein, the length of the reinforcing cut glass fibers can be between 0.125 and 1.50 inches; the preferred choice of length for obtaining the most desirable levels of moldability and wheel strength is 1 inch. The fiber content of the reinforcing fiber, on the weight of the plastic, can be between 30% and 75%; 65% being preferred for obtaining a uniform composite and a high strength level.

Resin-coated cut glass fibers can be used as can sheet-molding compositions prepared by spraying chopped fibers over successive resin layers. The wheel can then be molded by preparing the fibers or cut sheets containing same in a preheated mold and applying molding pressure for the duration of the molding cycle. This pressure can range between 1,000 and 6,000 psi and the molding cycle can range between 5 and 20 minutes. The optimum size of the cut sheets is equivalent to one-half the wheel area.

A mold that can be utilized is one consisting of three main parts: an upper part, lower part and a collar; when closed, said parts form a cavity which defines the shape of a given wheel. Each part is heated independently and the upper part includes projections for forming bolt holes, hand holes and the hub opening. The collar consists of two halves which can be separated by operating hydraulic pistons attached to said collar; the lower mold part includes ejector pins that fit around the hub. These pins are actuated by hydraulic pistons to eject the molded wheel for removal from the mold after completion of the molding cycle.

In the practice of the present invention to produce truck rims, in order to optimize the distribution of the reinforced plastic material, variable thicknesses to suit expected stress distributions in loading rims are planned for and anticipated by the mold dimensions. High stress areas must have greater thicknesses than lower stress areas and such high stress locations can be further strengthened, for example, by incorporating reinforcing hoops (optionally resin coated) of continuous glass fibers. These hoops are manufactured separately on filament winding machines and are positioned in the mold prior to placement of the other molding materials namely the cut fibers and the plastic. These hoops do not interfere with the placing of the reinforced plastic which flows around the hoops during compression molding. A significant function of the hoops is that in the areas reinforced by such hoops, larger portions of the load are attracted thereto due to their greater stiffness. This significantly improves the margin of safety in other regions of the rim.

It is significant to note that a plastic wheel produced in the practice of this invention, in combination with a pneumatic tire when subjected to a brake test conducted at a 1200 lb. load and after 33,000 braking cycles, continued to perform satisfactorily; this shows acceptable wheel performance.

The bead push-off test was conducted successfully with my plastic wheel utilizing lateral thrusts at 2850 lbs.; this acceptable impact resistance to such a thrust more than adequately meets the DOT 2,000 lb. lateral force characterization indicated desirable to be met without the bead pushing off the rim.

The invention reinforced plastic wheel in combination with pneumatic tire at standing load (passenger) of from 800 to 1600 lbs., and an inflation pressure of from 24 to 32 psi, generates an outward force on the inside of the rim; the generated force within the range of 10,000 to 25,000 lbs. was handled without bursting. My plastic wheel and tire combinations has been subjected to inflation pressures up to three times the maximum recommended for normal inflation without bursting.

The curb wear test is a reflection of acceptable sidewall performance and was successfully met with my plastic wheel and pneumatic tire combination after 300,000 cycles; this test was conducted by maintaining the wheel and tire against a supporting plate under normal passenger loads while moving said plate laterally back and forth through 300,000 cycles.

A further test that was utilized and renders acceptable my compression molded reinforced plastic wheel was that test utilized to determine fatigue for steel wheels; the required acceptable standard was one of functioning acceptably for 400,000 cycles under a 2260 lb. load and straight rolling on the drum. My plastic rim functions successfully in this test procedure after more than 988,000 cycles.

Wheels and rims that are represented in the brochure entitled "Firestone Accu-Ride Wheels and Rims" — No. M-509-44 (1975) can be prepared in the practice of the present invention, it being understood that where any such rim, wheel and/or disc member is required, that it can be molded individually and then routinely assembled for both passenger car and truck tires end use.

In the brochure identified as "Firestone Electric Wheel Company" — Catalog No. 176-S, there is described off-the-road wheel rims of metal, which rims can be compression molded out of the cut fiber glass reinforced plastic in the practice of the present invention.

The pneumatic tires used in combination with my plastic wheel are commercially available tire brands and of operational quality and were selected on the basis of their intended use.

The preceding specification can be varied within its total context as construed by one skilled in the art to achieve substantially the same results as exemplified herein.

What is claimed is:

1. A compression molded cut glass fiber reinforced plastic wheel, the rim, disc and hub portions of said wheel being uniformally and predominately axially reinforced by cut glass fibers located in planes parallel to the axis of said wheel, said cut glass fibers being from ⅛ inch to 1-½ inches in length and present in an amount within the range of 35% to to 75% on the weight of said plastic.

2. A compression molded reinforced plastic wheel according to claim 1 wherein said plastic is a polyimide and said cut fiber is ¼ inch in length and present at a weight percent of 65.

3. A compression molded reinforced plastic wheel according to claim 1 wherein said plastic contains said cut fibers 1 inch in length.

4. A compression molded reinforced plastic wheel according to claim 1 wherein said wheel is compression molded to an increased dimension at points of maximum stress.

5. A compression molded cut glass fiber reinforced polyimide plastic wheel, the rim, disc and hub portions of said wheel being uniformally and predominately axially reinforced by cut glass fibers located in planes parallel to the axis of said wheel, said cut glass fibers being ¼ inch in length and present in an amount of 65% on the weight of said polyimide plastic.

6. A compression molded cut glass fiber reinforced plastic wheel, the rim, disc and hub portions of said wheel being molded from a reinforced polyester sheet molding compound consisting essentially of polyester resin and 1 inch long cut glass fibers present in an amount of 65% on the weight of said resin, said rim, disc and hub portions being uniformally and predominately axially reinforced by said cut glass fibers located in planes parallel to the axis of said wheel.

* * * * *